Aug. 29, 1944. F. F. PAINTER 2,356,878
VEHICULAR GLAZING CONSTRUCTION
Filed Nov. 5, 1940
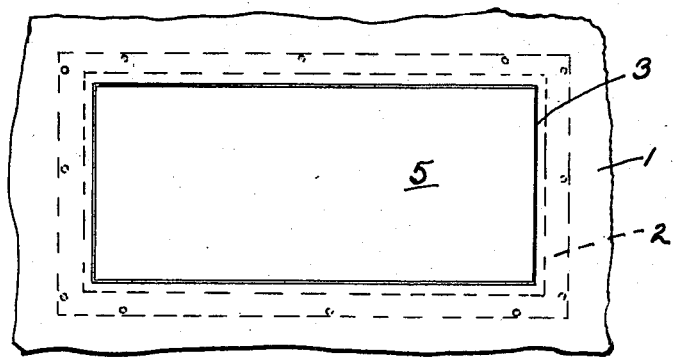
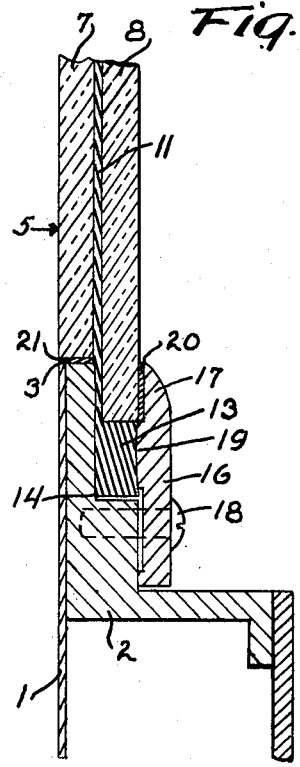
Inventor
FRANK F. PAINTER Patented Aug. 29, 1944

2,356,878

UNITED STATES PATENT OFFICE 2,356,878

VEHICULAR GLAZING CONSTRUCTION

Frank F. Painter, Tarentum, Pa., assignor to Pittsburgh Plate Glass Company, Allegheny County, Pa., a corporation of Pennsylvania Application November 5, 1940, Serial No. 364,435

5 Claims. (Cl. 189—64)

The present invention relates to vehicular glazing and more particularly to a glazing construction of a resilient character.

One object of the invention is to provide a window structure which will successfully withstand relatively great variations in external and internal pressures to which it is exposed.

A further object of the invention is the provision of a sealed window structure which will retain the desired degree of flexibility therein.

Other objects and advantages of the invention will become more apparent from the following detailed description of certain preferred embodiments thereof.

The ordinary vehicular construction involves the use of laminated transparent glazing panels which are generally permanently secured within a suitable frame. Although cushioning strips are interposed between the glass plates and the frame, localized areas of strain in the glass are set up due to the clamping action of the frame. This type of glazing when employed in surface transportation and in aircraft cabins engaged in standard flights has been satisfactory.

The recent development of airplanes for travel in the sub-stratosphere has created numerous problems in the standard glazing. For example, atmospheric pressure is maintained within the body of the aircraft while the exterior pressure is considerably lower. Obviously this pressure differential results in an outwardly bowing of the glazing panels and any strains therein caused by improper mounting are magnified until the panel is ruptured. In addition it is necessary that the aircraft cabin be substantially airtight in order that vital pressure may be maintained therein. The customary window mountings do not admit of adequate sealing and accordingly cannot be employed.

Briefly stated the present invention contemplates a glazing construction employing a laminated glass unit whose plastic interlayer has an integral, projecting flexible border to serve as the securing and sealing means for the laminated unit.

In the drawing,

Figure 1 is a fragmentary front elevational view of a glazing construction embodying the principles of my invention; and Figure 2 is a fragmentary vertical sectional view thereof.

Referring to the drawing, a vehicle body 1 is provided with a structural framework 2 surrounding an opening 3. A panel 5 of laminated glass is secured within the frame 2 to close the opening 3. As shown in Figure 2 the panel 5 comprises glass plates 7 and 8 secured together by a sheet 11 of a suitable plastic reinforcing material, such as a vinyl acetal resin. The plastic material projects beyond the edges of the glass plate 8, and has, as an integral part thereof, a border 13 extending completely around the panel 5. The glass plate 7, lying to the outside of the panel 5, is preferably of smaller dimensions than the plate 8, in order that there will be an offset in the panel permitting a flush mounting with respect to the body 1. The frame member 2 is provided with a rabbet 14 in which the panel 5 is seated.

A retaining member 16 having a flange 17 of sufficient length to overlap the edges of the panel 5 is secured to the frame member 2 by screws 18, or other suitable means, at spaced intervals. Located centrally of the member 16 is an enlarged section 19 which is forced into close proximity to the frame 2, thus pressing tightly against the flexible relatively thick border 13 extending from the panel 5 and providing an adequate seal for the construction. A body 20 of soft mastic or caulking compound is used to fill the space between the panel 5 and the flange 17 and a filling 21 of similar material is applied between the plate 7 and the frame 2.

The border 13 has a thickness substantially equivalent to that of the plate 8 and thus affords a stronger sealing contact with the retaining member 16.

It will be observed that no excessive pressures are exerted on the edges of the panel 5 by the supporting structure because the clamping and mounting elements for the laminated unit are applied directly to the plastic border 13. Manifestly, therefore, no strains will be developed in the glass laminae of the panel to promote failure thereof. When the panel is exposed to a pressure differential the mastic fillings 20 and 21 will permit considerable flexing of the panel without bringing the glass laminae into direct contact with the supporting structure. While in the ordinary mounting, this flexing of the panel would negative the value of an edge seal, in the proposed structure the seal afforded through the projecting plastic border remains unaffected.

The glass panel 5 may be composed of glass plates of varying thicknesses arranged in any of several combinations. However, it is preferred that the plate 8 be of tempered glass, in order that the assembly may be subjected to considerable flexing without rupture of the glass laminae.

Of course the other plate could also be made of tempered glass if desired.

It will at once be obvious that various modifications in the form of the several elements and their arrangement in the construction are possible without departing from the spirit of my invention or the scope of the appended claims.

What I claim is:

1. In a closure structure for an opening in a wall, an interlayer of flexible organic plastic, glass plates bonded on opposite sides of the interlayer and defining therewith a laminated unit, marginal portions of the interlayer extending beyond the edges of the glass plates and constituting a flexible sealing border, edges of the glass plates being offset and defining a single thickness of glass along and beyond which the interlayer extends, clamping frame members pressing in sealing relation upon opposite sides of the extended marginal border of the interlayer, one of said frame members overlapping the single thickness of glass and having a portion of the interlayer between the latter frame member and the glass of single thickness, the other frame member having its border-clamping portion disposed beyond the edges of the glass, and means for clamping the frame members to the sealing border in their sealing relation.

2. In a closure structure for an opening in a wall, an interlayer of flexible organic plastic, glass plates bonded upon opposite sides of the interlayer and defining therewith a laminated unit, relatively thick marginal portions integral with the interlayer extending beyond the edges of the glass plates and constituting a flexible sealing border, edges of the glass plates being offset and defining a single thickness of glass along and beyond which the interlayer border extends, clamping frame members pressing in sealing relation upon opposite sides of the thicker marginal border and having the single thickness of glass plate disposed therebetween, and means for clamping the frame members to the sealing border in their sealing relation.

3. In a closure structure for an opening in a wall, an interlayer of flexible organic plastic, glass plates bonded upon opposite sides of the interlayer and defining therewith a laminated unit, relatively thick marginal portions integral with the interlayer extending beyond the edges of the glass plates and constituting a flexible sealing border, edges of the glass plates being offset and defining a single thickness of glass along and beyond which the interlayer border extends, clamping frame members pressing in sealing relation upon opposite sides of the thicker marginal border and having the single thickness of glass disposed therebetween, yieldable plastic filler disposed between one of the frame members and the face of the offset single thickness of glass, and means for clamping the frame members to the sealing border in their sealing relation.

4. A laminated transparent closure comprising a plurality of panes of transparent material, at least one outer pane of which is of reduced area relative to the other panes to form a rebate around the margin of the closure, and at least one intervening layer of a resilient, deformable and waterproof transparent material bonded between adjacent panes of the first mentioned material and extending beyond the marginal edges thereof, said extended portions of the intervening layer being of increased thickness relative to that part thereof bonded between the first mentioned panes and being tough, pliant and deformable under clamping pressure to such an extent as to provide a leak-proof gasket for the transparent closure.

5. A laminated transparent closure comprising a plurality of panes of transparent material at least one outer pane of which is of reduced area relative to the other panes to form a rebate around the margin of the closure, and at least one intervening layer of transparent material bonded between adjacent panes of the first mentioned material and extending beyond the marginal edges thereof, said extended portions of the intervening layer being of increased thickness relative to that part thereof bonded between the first-mentioned panes and being tough, pliant, and flowable under compressive pressure to such an extent as to provide a leak-proof gasket for the transparent closure and mounting structure having means for compressively gripping said projecting edges of the bonding layer to effect a leak-proof joint between said closure and mounting structure while permitting movement of the transparent closure relative to said mounting structure.

FRANK F. PAINTER.